US008005867B2

(12) United States Patent
Abraham et al.

(10) Patent No.: US 8,005,867 B2
(45) Date of Patent: Aug. 23, 2011

(54) SYSTEM AND METHOD FOR MEASURING THE VALUE OF ELEMENTS IN AN INFORMATION REPOSITORY

(75) Inventors: Robert Low Abraham, Marietta, GA (US); Christopher J. Davis, Marietta, GA (US); Scott Kelly Hayward, Coquitlam (CA)

(73) Assignee: International Business Machines Corporation, Armonk, NY (US)

( * ) Notice: Subject to any disclaimer, the term of this patent is extended or adjusted under 35 U.S.C. 154(b) by 901 days.

(21) Appl. No.: 11/868,470

(22) Filed: Oct. 6, 2007

(65) Prior Publication Data

US 2008/0114788 A1    May 15, 2008

(30) Foreign Application Priority Data

Nov. 9, 2006 (CA) ..................................... 2567428

(51) Int. Cl.
  *G06F 7/00* (2006.01)
(52) U.S. Cl. ........................................ 707/796; 707/802
(58) Field of Classification Search .................. 707/803, 707/802, 791, 796, 797
  See application file for complete search history.

(56) References Cited

U.S. PATENT DOCUMENTS

| | | | | |
|---|---|---|---|---|
| 5,828,883 | A * | 10/1998 | Hall | 717/133 |
| 6,633,869 | B1 | 10/2003 | Duparcmeur et al. | |
| 6,701,363 | B1 | 3/2004 | Chiu et al. | |
| 6,836,776 | B2 | 12/2004 | Schreiber | |
| 7,418,438 | B2 * | 8/2008 | Gould et al. | 1/1 |
| 7,606,781 | B2 * | 10/2009 | Sweeney et al. | 706/48 |
| 7,725,499 | B1 * | 5/2010 | von Lepel et al. | 707/803 |
| 2003/0004960 | A1 | 1/2003 | Pressmar | |
| 2003/0110250 | A1 | 6/2003 | Schnitzer et al. | |
| 2003/0139900 | A1 | 7/2003 | Robison | |
| 2004/0267728 | A1 | 12/2004 | Delic et al. | |
| 2005/0015376 | A1 | 1/2005 | Fraser et al. | |
| 2005/0043977 | A1 | 2/2005 | Ahern et al. | |
| 2005/0114510 | A1 | 5/2005 | Error et al. | |
| 2005/0160081 | A1 | 7/2005 | Casati et al. | |
| 2005/0198073 | A1 | 9/2005 | Becks et al. | |

OTHER PUBLICATIONS

Not, E.; Zancanaro, M.; "Reusing Information Repositories for Flexibly Generating Adaptive Presentations".
Banker et al.; "Automating Output Size and Reuse Metrics in a Repository-Based Computer-Aided Software (CASE) Environment"; IEEE Transactions on Software Engineering; vol. 20, No. 3, Mar. 1994, pp. 169-187.
Banker et al.; "Repository Evaluation of Software Reuse"; IEEE Transactions on Software Engineering; vol. 19, No. 4, Apr. 1993.

* cited by examiner

*Primary Examiner* — Angela M Lie
(74) *Attorney, Agent, or Firm* — Schmeiser, Olsen & Watts; John Pivnichny (57) ABSTRACT

A system and method for measuring the value of elements in an information repository includes, in one embodiment, various methods of measuring the value of elements in an information repository are provided. Knowing which elements in the repository are most used may define one measure of their value. This may serve a number of business purposes including, for example, establishing how to price those assets if they are sold; identifying which assets are candidates for further investment; assessing the performance of the information developers who created them; deciding which assets should be retired from the repository; and measuring the level of asset reuse in an organization.

6 Claims, 6 Drawing Sheets

FIG. 1

PRIOR ART

FIG. 2

PRIOR ART

SYSTEM AND METHOD FOR MEASURING THE VALUE OF ELEMENTS IN AN INFORMATION REPOSITORY

CROSS-REFERENCE TO RELATED APPLICATIONS

This application claims priority from Canadian Patent Application Serial Number CA 2567428 filed on Nov. 9, 2006.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

This invention relates generally to the field of systems and methods for measuring the value of elements in an information repository, and more particularly to a system and method which selects a target element from within the information repository and analyzes structural relationships between the target element and other elements in the information repository.

BACKGROUND OF THE INVENTION

Information repositories may combine a plurality of elements into hierarchical structures. For example, in an instructional or training system, an information repository may contain a plurality of modules (i.e. elements) that may be organized into a course lecture. These elements may be combined in different ways, and may be copied or modified to create new ones to form different course lectures.

As another example, a software development company may develop and maintain a portfolio of different software products. The company may build one or more independent elements that are shared amongst products within the portfolio. This may reduce development time and increase quality because existing, field-tested subcomponents may be reused.

While such information repositories may be a valuable resource for reducing development time, it may be difficult to determine the relative value of the elements, especially when looking to select from amongst multiple versions. What are needed are systems and methods for measuring the value of these elements.

SUMMARY OF THE INVENTION

Briefly stated, a system and method for measuring the value of elements in an information repository includes, in one embodiment, various methods of measuring the value of elements in an information repository are provided. Knowing which elements in the repository are most used may define one measure of their value. This may serve a number of business purposes including, for example, establishing how to price those assets if they are sold; identifying which assets are candidates for further investment; assessing the performance of the information developers who created them; deciding which assets should be retired from the repository; and measuring the level of asset reuse in an organization.

According to an embodiment of the invention, a method of measuring a value of an element in an information repository containing a plurality of elements includes the steps of: (a) selecting a target element; (b) analyzing structural relationships between the target element and other elements in the information repository; (c) identifying at least one common attribute of the target element and each of the other elements; and (d) calculating a value for the target element in dependence upon the target element's hierarchical relationship to the other elements and the at least one identified common attribute.

According to an embodiment of the invention, a system for measuring a value of an element in an information repository containing a plurality of elements includes selection means for selecting a target element; analyzing means for analyzing structural relationships between the target element and other elements in the information repository; identification means for identifying at least one common attribute of the target element and each of the other elements; and calculating means for calculating a value for the target element in dependence upon the target element's hierarchical relationship to the other elements and the at least one identified common attribute.

According to an embodiment of the invention, a data processor readable medium storing data processor code that, when loaded into a data processing device, adapts the device to measure a value of an element in an information repository containing a plurality of elements, the data processor readable medium including code for selecting a target element; code for analyzing structural relationships between the target element and other elements in the information repository; code for identifying at least one common attribute of the target element and each of the other elements; and code for calculating a value for the target element in dependence upon the target element's hierarchical relationship to the other elements and the at least one identified common attribute.

Various methods of measuring the value of elements in an information repository are provided. In an embodiment of the present invention, knowing which elements in the repository are most used may define one measure of their value. This may serve a number of business purposes including, for example, establishing how to price those assets if they are sold; identifying which assets are candidates for further investment; assessing the performance of the information developers who created them; deciding which assets should be retired from the repository; and measuring the level of asset reuse in an organization.

DETAILED DESCRIPTION OF THE PREFERRED EMBODIMENT

As noted above, the present invention relates to a system and method for measuring the value of elements in an information repository.

Figure 1:
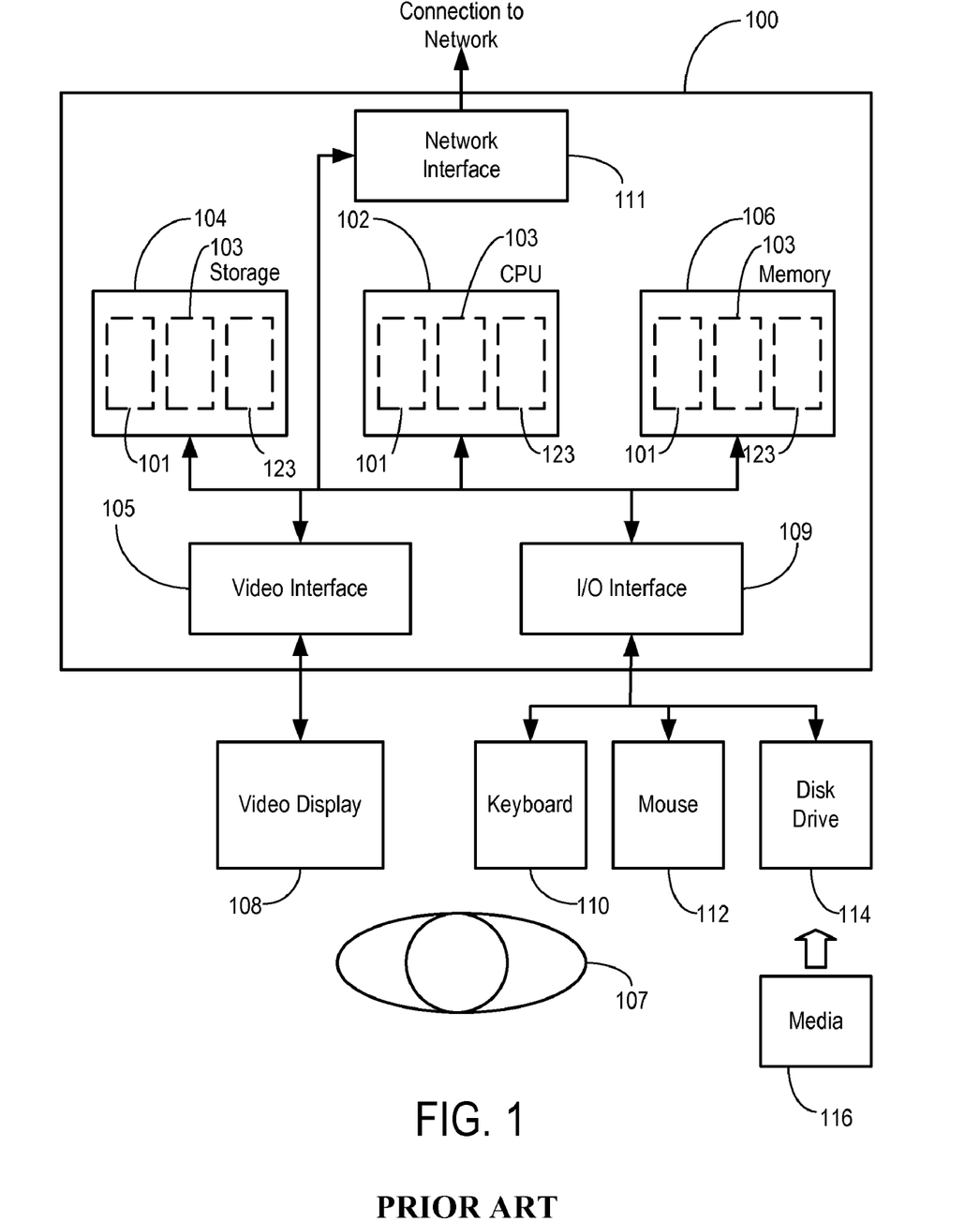
FIG. 1 shows a generic data processing system according to the prior art that may provide a suitable operating environment for the embodiments of the present invention.

The invention may be practiced in various embodiments. A suitably configured data processing system, and associated communications networks, devices, software and firmware may provide a platform for enabling one or more of these systems and methods. By way of example, FIG. 1 shows a generic data processing system 100 that may include a central processing unit ("CPU") 102 connected to a storage unit 104 and to a random access memory 106. The CPU 102 may process an operating system 101, application program 103, and data 123. The operating system 101, application program 103, and data 123 may be stored in storage unit 104 and loaded into memory 106, as may be required. An operator 107 may interact with the data processing system 100 using a video display 108 connected by a video interface 105, and various input/output devices such as a keyboard 110, mouse 112, and disk drive 114 connected by an I/O interface 109. In known manner, the mouse 112 may be configured to control movement of a cursor in the video display 108, and to operate various graphical user interface ("GUI") controls appearing in the video display 108 with a mouse button. The disk drive 114 may be configured to accept data processing system readable media 116. The data processing system 100 may form part of a network via a network interface 111, allowing the data processing system 100 to communicate with other suitably configured data processing systems (not shown). The particular configurations shown by way of example in this specification are not meant to be limiting.

The data processing system 100 of FIG. 1 may be used to store and share an information repository over a network, and other data processing systems 100 may be used to access the shared information repository over the network.

Figure 2:
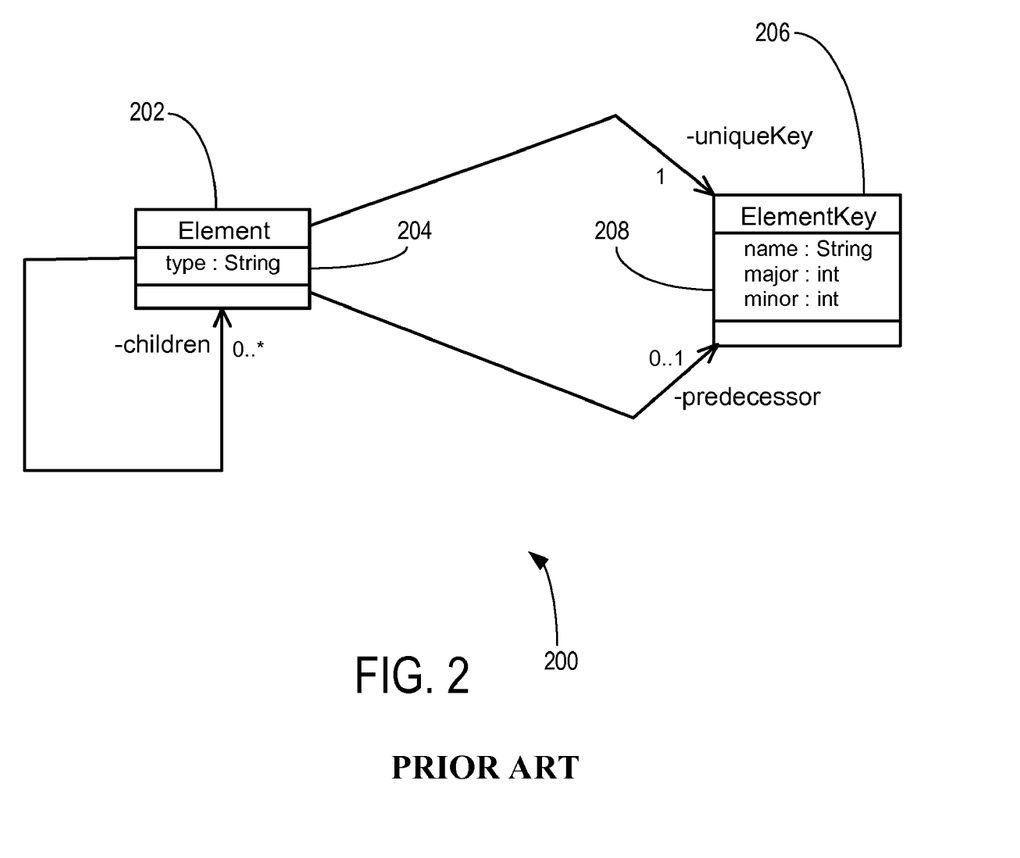
FIG. 2 shows a data structure of an illustrative information repository according to the prior art.

Referring to FIG. 2, shown is an illustrative data structure 200 according to the prior art of elements in an information repository as may be stored in a data processing system (e.g. data processing system 100 of FIG. 1). As shown, an element 202 may have one or more defined attributes including an element type 204 specified in this example with a data type of "string". The element type could also be "application", "component" or "subcomponent", for example. Element 202 may also have a hierarchical relationship with one or more children having the same data structure.

As an illustrative example, a software program repository may maintain dependencies between a high-level product and the elements used in order to build the product. This may define one or more parent-child relationships. For example, two parent programs, a word processor and a spreadsheet, might reuse parts of a child element that provides printing services. The printing element might also be a parent that uses some lower level text conversion utility elements.

Still referring to FIG. 2, each element 202 may have a unique element key 206 with one or more defined attributes 208 including a name, a "major" version, and a "minor" version. The name of an element 202, and the major and minor versions that make up the unique key 206 for the element 202 are typical in software releases, for example, and an information repository will manage each of these attributes for each element 202.

When new versions are constructed by modifying existing ones, a new branch may be created in the information repository. Thus, the structure of the information repository may allow tracking of the predecessor relationship. As will now be described in more detail, different types of metrics related to the use and reuse of elements 202 of the information repository may be calculated automatically from the structure of the information repository and the elements' attributes.

In the context of the present disclosure, "structural use" metrics may measure how frequently lower hierarchical level elements are used in higher ones (e.g. in the high-level products that make up a software development company's portfolio). As well, in the context of the present disclosure, "evolution use" metrics may measure how often an element is copied and modified over time to create new versions. Examples of these two types of metrics are provided below.

Figure 3:
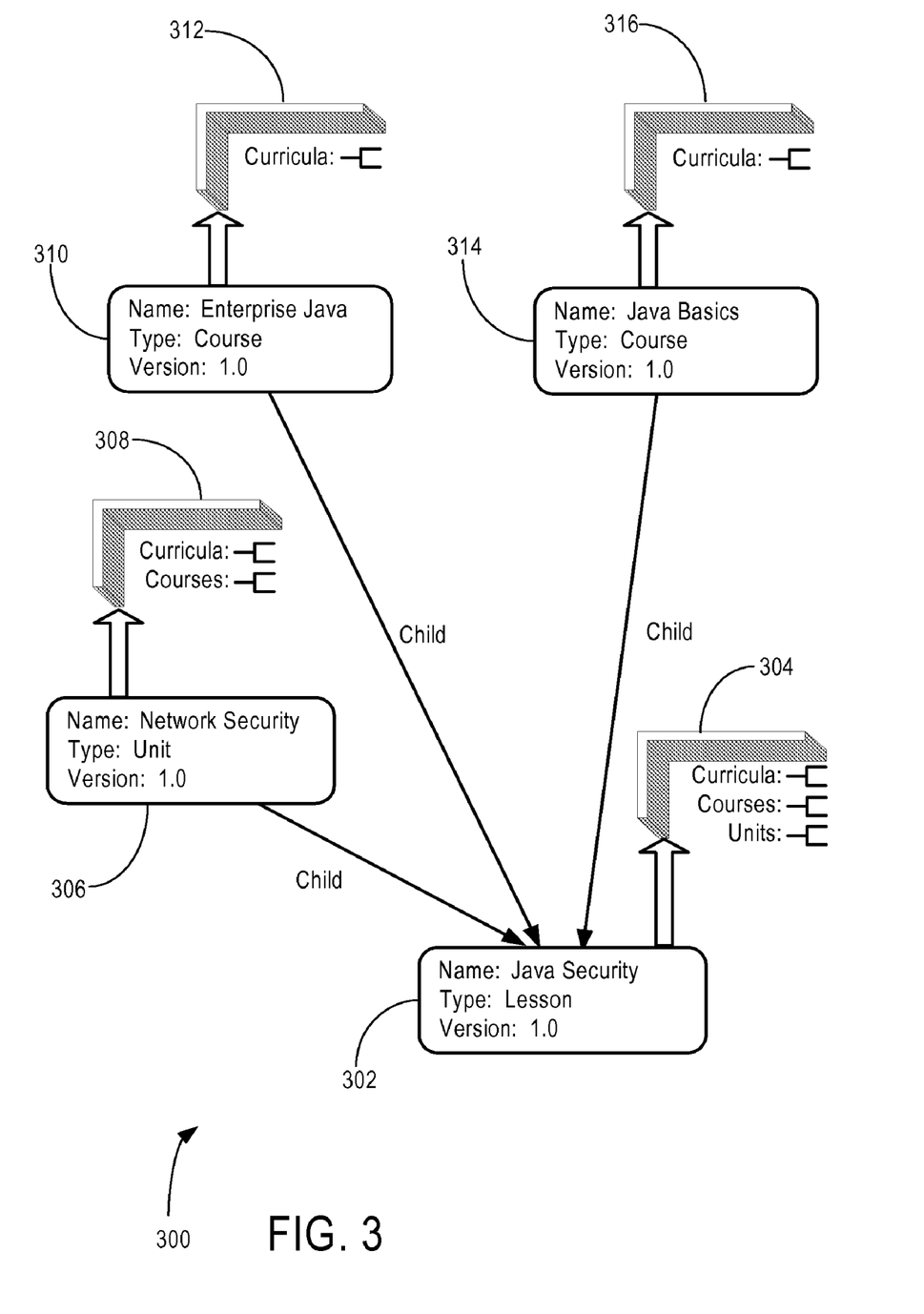
FIG. 3 shows a block diagram of elements of an illustrative information repository.

Referring to FIG. 3, shown is a schematic block diagram of elements of an information repository 300. In this example, the information repository 300 relates to course material for developing a lecture about the subject of Java Security. Thus, at block 302, the name, type and version is listed as "Java Security, Lesson, 1.0". Using the parent-child relationships shown, a number of metrics 304 can be calculated for an element. These metrics 304 enumerate the number of higher level elements in the hierarchy that reference block 302, including relationships with a plurality of parents shown at blocks 306, 310 and 314. Block 306 has a name, type, version of "Network Security, Unit, 1.0". Block 306 may have metrics 308 calculated based on the parent elements (not shown) that use it. Similarly, block 310 has a name, type, version of "Enterprise Java, Course, 1.0" and block 314 has a name, type, version of "Java Basics, Course, 1.0". Block 310 and block 314 respectively have metrics 312 and 316 calculated to measure the frequency with which they are use by other elements in the repository (not shown) that may be still higher up the hierarchy.

Figure 4:
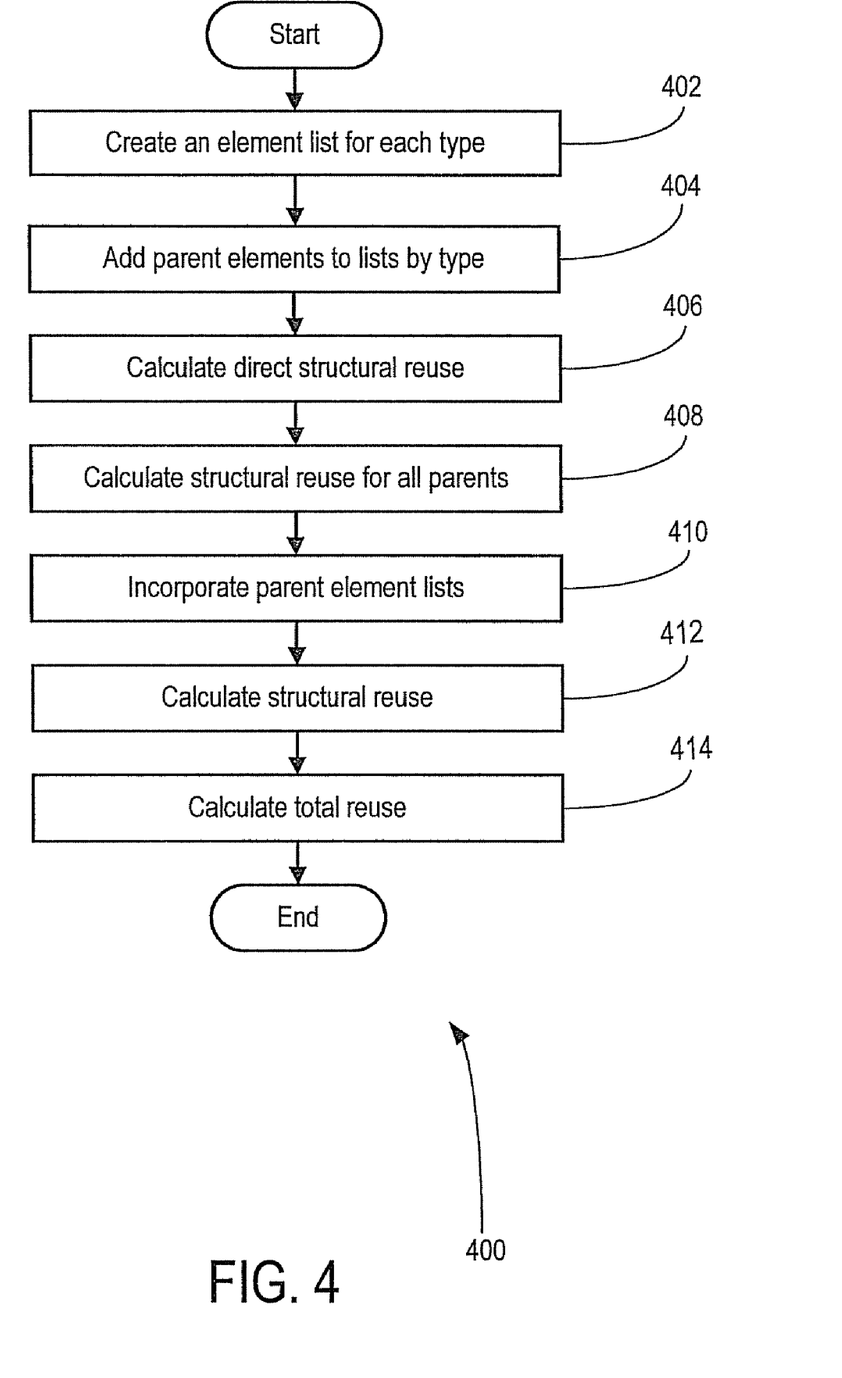
FIG. 4 shows a measurement method in accordance with an embodiment of the present invention.

Referring to FIG. 4, shown is a method 400 for measuring the "structural use" of an element in different hierarchical structures, such as that of FIG. 3. In an embodiment of the present invention, this structural use metric counts the number of times that an element is included as part of a larger hierarchy, measuring the use of different elements in the information repository by different users. Structural use may be measured in a number of different ways. For example, the measurement may be direct structural use, structural use by element type, or the total number of versions.

Structural metrics may be calculated using parent-child relationships defined in the data structure. As an illustrative example, consider element 302 at the bottom of FIG. 3, which we will presently refer to as the target element. In an embodiment, a method 400 for measuring the structural use of this target element 302 in the information repository 300 may proceed as described below.

Method 400 begins and, at block 402, creates an element list for each different type of element in the information repository 300 that is higher in the hierarchy than the type defined for the target element.

At block 404, method 400 adds parent elements to the element lists by type by querying the information repository 300 for all elements that list the target element 302 as one of their children. Duplicate names are not added.

At block 406, method 400 calculates direct structural reuse by type by counting the number of elements in each list by type. Direct structural use of elements by type is a structural use metric in accordance with an embodiment.

At block 408, method 400 determines structural reuse for all parent elements 306, 310, 314 of the target element 302. For each parent element 306, 310, 314 that lists the target element as its child, structural reuse is calculated. The structural reuse of a single element (i.e. the target element 302) is first calculated. Then, the calculation is repeated for each of its parent elements 306, 310, 314, leading to a number of recursive calculations of structural metrics for other elements in the information repository.

At block 410, method 400 incorporates parent element lists by adding all unique element names from each of the parents' lists by type to the target element's lists by type. No list should include multiple instances of the same name.

At block 412, method 400 calculates structural reuse by counting the number of names in each of the target element's lists to calculate the structural reuse by type. Structural reuse by type is a structural use metric in accordance with another embodiment.

At block 414, method 400 calculates total reuse by adding the structural reuse by type for all element types. The resulting sum is the total reuse, a structural use metric in accordance with yet another embodiment.

Figure 5:
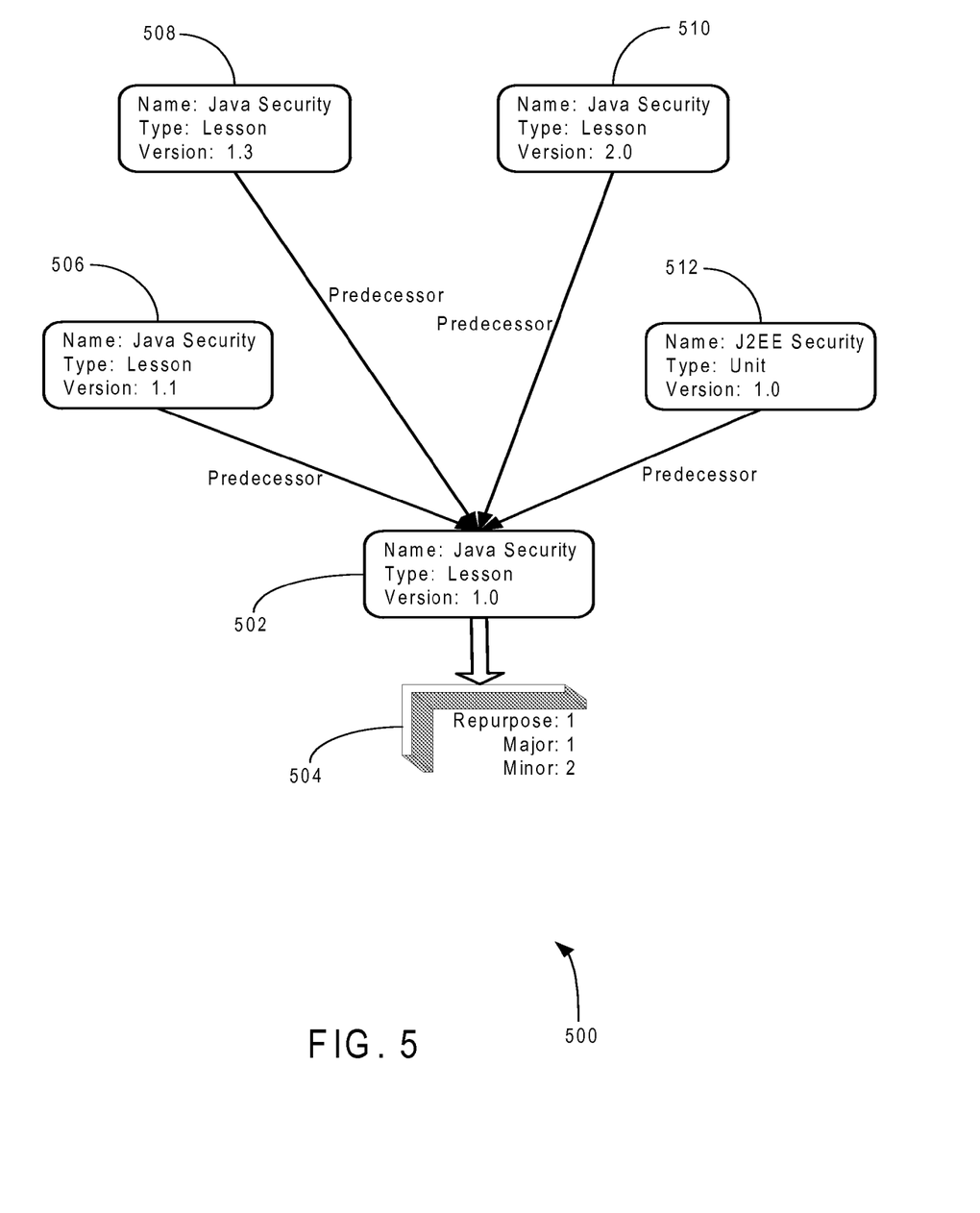
FIG. 5 shows a block diagram of other elements of an information repository.

Referring to FIG. 5, shown is a block diagram of other elements in an information repository 500. In accordance with an embodiment of the invention, "evolutionary reuse metrics" may be calculated using predecessor-successor relationships defined in the information repository 500 data structure. An evolutionary reuse metric may be a measure of the number of times an element has been reused by being copied and modified to create a new element. When this occurs, the new element lists the original one as its predecessor, and the new element is referred to as a successor of the original one. As an example, consider element 502 at the bottom of FIG. 5, which is referred to as the target element. The "evolutionary reuse metrics" for this target element 502 may be calculated as described below.

Figure 6:
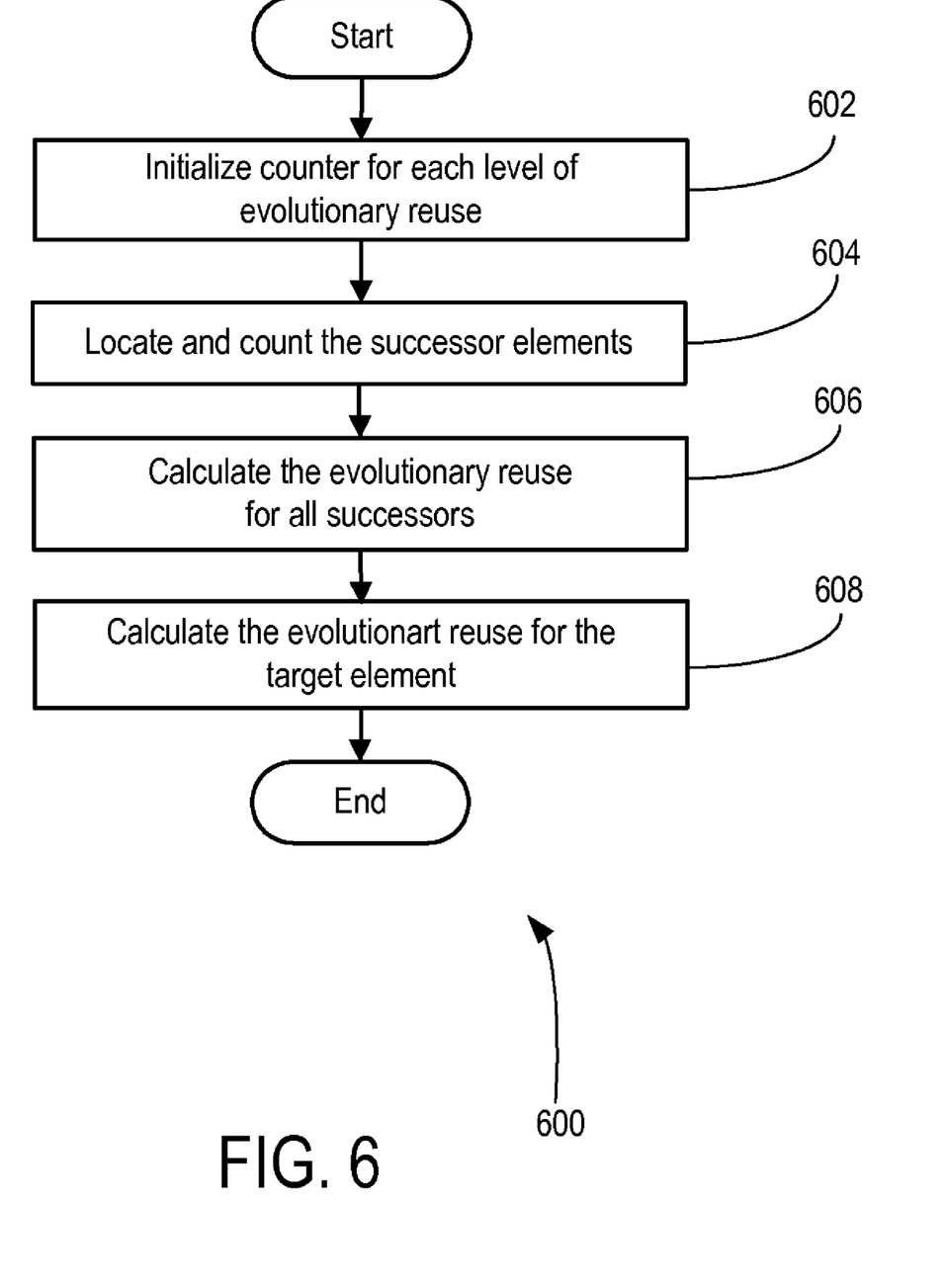
FIG. 6 shows another measurement method in accordance with an embodiment of the present invention.

Referring to FIG. 6, method 600 begins and at block 602 initializes a plurality of counters for each level of evolutionary reuse. For example, method 600 may create three counters to measure (i) how often the target element or one of its successors was repurposed to an entirely new element, (ii) how often the target element or one of its successors was modified to create a new major release, and (iii) how often the target element or one of its successors was modified to create a new minor release.

At block 604, method 600 locates and counts the successor elements of the target element 502. This is done by querying the repository for all elements that list the target element 502 as their predecessor. For each such successor element, one of the three counters may be incremented depending on whether the successor element has (i) a different name, (ii) the same name, but a different major version, or (iii) the same name and major version, but a different minor version.

At block 606, method 600 may proceed to calculate the evolutionary reuse for all successor elements that list the target element 502 as their child. This may be done recursively for each successor element.

At block 608, method 600 calculates the evolutionary reuse for the target element by adding the number of instances of evolutionary reuse of each of its successors to the corresponding counter for the target element.

In other embodiments, various other types of use metrics may be calculated. For example, a "repurpose migration reuse" metric may count the number of new entities (with new names) created from an element. As another example, a "major version migration reuse" metric may count the number of new entities and major versions created from an element. Similarly, a "minor version migration reuse" metric may count the number new entities, major and minor versions created from an element.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A method of measuring a value of an element in an information repository containing a plurality of elements, said method comprising:
   selecting a target element;
   analyzing structural relationships between the target element and other elements in the information repository;
   identifying at least one common attribute of the target element and each of the other elements; and
   a processor of a data processing system calculating a value for the target element in dependence upon the target element's hierarchical relationship to the other elements and the identified at least one common attribute,
   wherein each element of the plurality of elements further comprises an element type characterizing each element's type, wherein at least two elements of the plurality of elements have a different element type, wherein the structural relationship is a parent-child hierarchical relationship, and wherein the method further comprises:
      calculating the value for the target element as a structural reuse of the target element by element type as equal to the number of parent elements of each element type that list the target element as one of their children; and
      calculating total structural reuse as equal to a sum of the calculated structural reuse of the target element by element type over all of element types comprised by the plurality of elements.

2. A method of measuring a value of an element in an information repository containing a plurality of elements, said method comprising:
   selecting a target element;
   analyzing structural relationships between the target element and other elements in the information repository;
   identifying at least one common attribute of the target element and each of the other elements; and
   a processor of a data processing system calculating a value for the target element in dependence upon the target element's hierarchical relationship to the other elements and the identified at least one common attribute,
   wherein the structural relationship is a predecessor-successor relationship, and wherein the method further comprises calculating an evolutionary reuse metric for the target element based on the number of successor elements that have reused the target element or one of its successor elements,
   wherein the at least one common attribute of the target element further includes a major version and a minor version, and wherein the method further comprises:
      measuring, using a first counter, how often the target element or one of its successors was repurposed to an entirely new element;
      measuring, using a second counter, how often the target element or one of its successors was modified to create a major new release; and
      measuring, using a third counter, how often the target element or one of its successors was modified to create a new minor release.

3. A data processing system comprising a processor and a computer readable memory unit coupled to the processor, said memory unit containing program code configured to be executed by the processor to implement a method for measuring a value of an element in an information repository containing a plurality of elements, said method comprising:
   selecting a target element;
   analyzing structural relationships between the target element and other elements in the information repository;

identifying at least one common attribute of the target element and each of the other elements; and calculating a value for the target element in dependence upon the target element's hierarchical relationship to the other elements and the identified at least one common attribute, wherein each element of the plurality of elements further comprises an element type characterizing each element's type, wherein at least two elements of the plurality of elements have a different element type, wherein the structural relationship is a parent-child hierarchical relationship, and wherein the method further comprises:

calculating the value for the target element as a structural reuse of the target element by element type as equal to the number of parent elements of each element type that list the target element as one of their children; and calculating total structural reuse as equal to a sum of the calculated structural reuse of the target element by element type over all of element types comprised by the plurality of elements.

4. A data processing system comprising a processor and a computer readable memory unit coupled to the processor, said memory unit containing program code configured to be executed by the processor to implement a method for measuring a value of an element in an information repository containing a plurality of elements, said method comprising:

selecting a target element;

analyzing structural relationships between the target element and other elements in the information repository;

identifying at least one common attribute of the target element and each of the other elements; and calculating a value for the target element in dependence upon the target element's hierarchical relationship to the other elements and the identified at least one common attribute, wherein the structural relationship is a predecessor-successor relationship, and wherein the method further comprises calculating an evolutionary reuse metric for the target element based on the number of successor elements that have reused the target element or one of its successor elements, wherein the at least one common attribute of the target element further includes a major version and a minor version, and wherein the method further comprises:

measuring, using a first counter, how often the target element or one of its successors was repurposed to an entirely new element;

measuring, using a second counter, how often the target element or one of its successors was modified to create a major new release; and measuring, using a third counter, how often the target element or one of its successors was modified to create a new minor release.

5. A data processor readable storage device having computer readable program code stored therein, said program code configured to be executed by a processor of a data processing system to implement a method of measuring a value of an element in an information repository containing a plurality of elements, said method comprising:

selecting a target element;

analyzing structural relationships between the target element and other elements in the information repository;

identifying at least one common attribute of the target element and each of the other elements; and calculating a value for the target element in dependence upon the target element's hierarchical relationship to the other elements and the identified at least one common attribute, wherein each element of the plurality of elements further comprises an element type characterizing each element's type, wherein at least two elements of the plurality of elements have a different element type, wherein the structural relationship is a parent-child hierarchical relationship, and wherein the method further comprises:

calculating the value for the target element as a structural reuse of the target element by element type as equal to the number of parent elements of each element type that list the target element as one of their children; and calculating total structural reuse as equal to a sum of the calculated structural reuse of the target element by element type over all of element types comprised by the plurality of elements.

6. A data processor readable storage device having computer readable program code stored therein, said program code configured to be executed by a processor of a data processing system to implement a method of measuring a value of an element in an information repository containing a plurality of elements, said method comprising:

selecting a target element;

analyzing structural relationships between the target element and other elements in the information repository;

identifying at least one common attribute of the target element and each of the other elements; and calculating a value for the target element in dependence upon the target element's hierarchical relationship to the other elements and the identified at least one common attribute, wherein the structural relationship is a predecessor-successor relationship, wherein the method further comprises calculating an evolutionary reuse metric for the target element based on the number of successor elements that have reused the target element or one of its successor elements, wherein the at least one common attribute of the target element further includes a major version and a minor version, and wherein the method further comprises:

measuring, using a first counter, how often the target element or one of its successors was repurposed to an entirely new element;

measuring, using a second counter, how often the target element or one of its successors was modified to create a major new release; and measuring, using a third counter, how often the target element or one of its successors was modified to create a new minor release.

* * * * *